(No Model.)
F. M. CUMMINGS.
Cheese Curd Sifter and Picker.
No. 234,543. Patented Nov. 16, 1880.
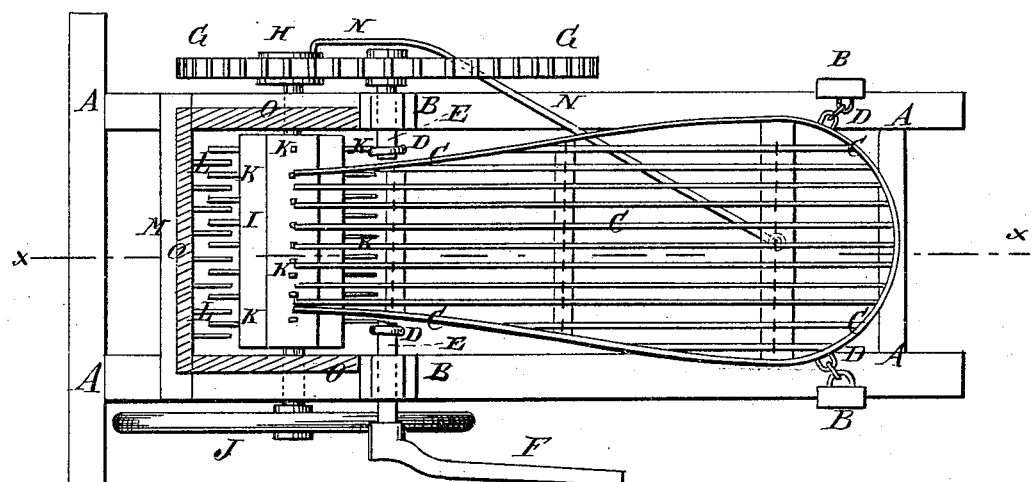
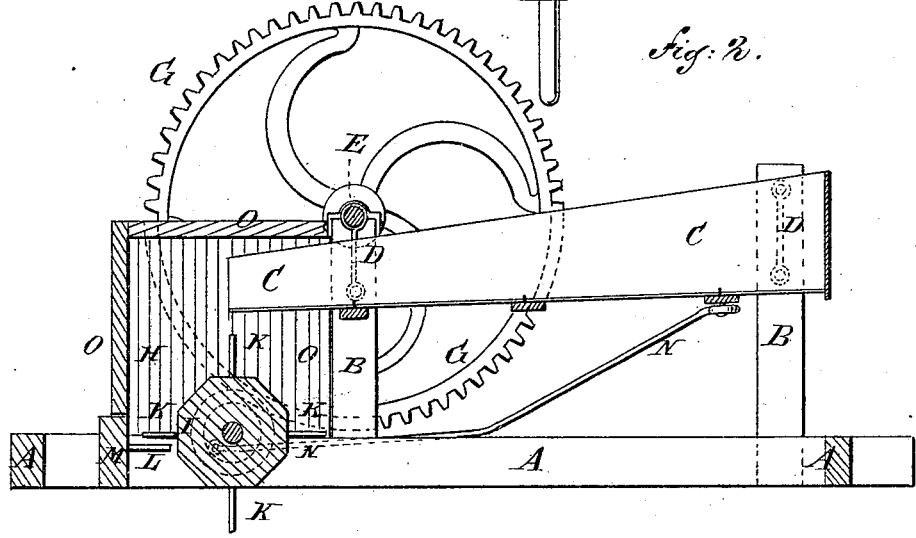
WITNESSES:
Chas. Nidd
C. Sedgwick
INVENTOR:
F. M. Cummings
BY Munn &Co
ATTORNEYS.

UNITED STATES PATENT OFFICE.

FRANCIS M. CUMMINGS, OF PORTERVILLE, NEW YORK.

CHEESE-CURD SIFTER AND PICKER.

SPECIFICATION forming part of Letters Patent No. 234,543, dated November 16, 1880.

Application filed September 9, 1880. (No model.)

*To all whom it may concern:*

Be it known that I, FRANCIS MARION CUMMINGS, of Porterville, in the county of Erie and State of New York, have invented a new and useful Improvement in Cheese-Churd Sifters and Pickers, of which the following is a specification.

Figure 1 is a plan view of the improvement, the cover being shown in section. Fig. 2 is a sectional side elevation taken through the line *x x*, Fig. 1.

The object of this invention is to furnish cheese-curd sifters and pickers so constructed as to sift out the fine curd and pick the coarser or lumpy curd into pieces, reducing the curd to the desired fineness to receive the salt evenly with very little injury to the curd and loss of "white whey" from the curd.

The invention consists in constructing a cheese-curd sifter and picker of a supporting-frame having standards attached to it, a sieve suspended by pivoted rods, a shaft having a crank, a pair of gear-wheels, a cylinder having rows of teeth, a bar having teeth, a shaker-rod for agitating the sieve from the gear-wheels, and a cover to prevent the curd from flying about when being picked, as will be hereinafter fully described.

Similar letters of reference indicate corresponding parts.

A represents a frame, which is designed to be placed over a vat or other receiver for the curd. To the side bars of the frame A are attached standards B, between which is placed the sieve C. The sieve C may be formed by attaching longitudinal wires to cross bars or rods at such a distance apart as will allow the fine curd to pass through, while the coarser curd slides down to the forward end of the said sieve. The sides and rear end of the sieve C are provided with a flange or hoop to confine the curd, and the rear part of the sieve may be wider than the forward part for convenience in putting in the curd.

The sieve C is suspended by four rods, D, the lower ends of which are hinged to its sides. The upper ends of the rear pair of rods D are hinged to the rear standards, B. The upper ends of the forward pair of rods D have eyes formed in them to receive the shaft E, which revolves in bearings attached to the upper ends of the forward standards, B.

To one end of the shaft E is attached the crank F, by means of which it is revolved. To the other end of the shaft E is attached a large gear-wheel, G, the teeth of which mesh into the teeth of a small gear-wheel, H, attached to a journal of the cylinder I. The cylinder I is parallel with the shaft E, and its journals revolve in bearings attached to the side bars of the frame A in such a position that the cylinder I will be directly beneath the forward end of the sieve C. To the other journal of the cylinder I is attached a fly-wheel, J, to give momentum and steadiness of motion to the machine.

To the cylinder I are attached rows of pins, spikes, or teeth K in such positions as to pass between the pins, spikes, or teeth L attached to a bar, M, placed parallel with the cylinder I, and attached at its ends to the side bars of the frame A.

To the small gear-wheel H is pivoted the end of a rod, N, which passes back below the large gear-wheel G, is bent inward, and its rear end is pivoted to the middle rear part of the sieve C, so that the said sieve will be agitated by the driving-gearing of the machine.

With this construction, as the machine is operated the fine curd will fall through the sieve C into a receiver beneath it, and the coarser curd will be fed forward and will fall from the forward end of the said sieve to the cylinder I, and will be torn or picked into pieces between the teeth L of the bar M and the teeth K of the said cylinder I. The cylinder I and the forward end of the sieve C are covered by a hood or cover, O, to keep the curd from flying about when acted upon by the teeth K L.

With this machine the curd can be brought to a uniform fineness and a proper condition for the subsequent operations in cheese-making with very little labor and in a very short time. The machine is also very useful for aerating and cooling off floating curds, slippery curds, and other classes of curds by passing the said curds slowly or quickly through the machine, as may be required.

Having thus fully described my invention, I claim as new and desire to secure by Letters Patent—

1. A cheese-curd sifter and picker constructed substantially as herein shown and described, consisting of the frame A, having standards B attached to it, the sieve C, suspended by rods D, the shaft E, having crank F, the gear-wheels G H, the cylinder I, having fly-wheel J and teeth K, the bar M, having teeth L, the shaker-rod N, and the cover O, as set forth.

2. In a cheese-curd sifter and picker, the combination, with the suspended sieve C, the gear-wheels G H, and the rod N, of the cylinder I, having teeth K, and the bar M, having teeth L, substantially as herein shown and described, whereby the coarser curd is picked or torn into pieces as it passes from the sieve, as set forth.

3. In a cheese-curd sifter and picker, the combination, with the toothed cylinder I K, the toothed bar M L, the gear-wheels G H, and the rod N, and the suspended sieve C, of a cover, O, substantially as herein shown and described, whereby the curd is kept from flying about when being picked, as set forth.

FRANCIS MARION CUMMINGS.

Witnesses:
A. C. SHEPARD,
STEPHEN CURTIS.